May 24, 1960 W. SCHMID 2,938,132
ELECTRIC CONTROL OF MACHINE TOOLS USING CONTROL
IMPULSES OF DIFFERENT FREQUENCIES
Filed Aug. 29, 1952 3 Sheets-Sheet 1

INVENTOR:
WOLFGANG SCHMID
BY:

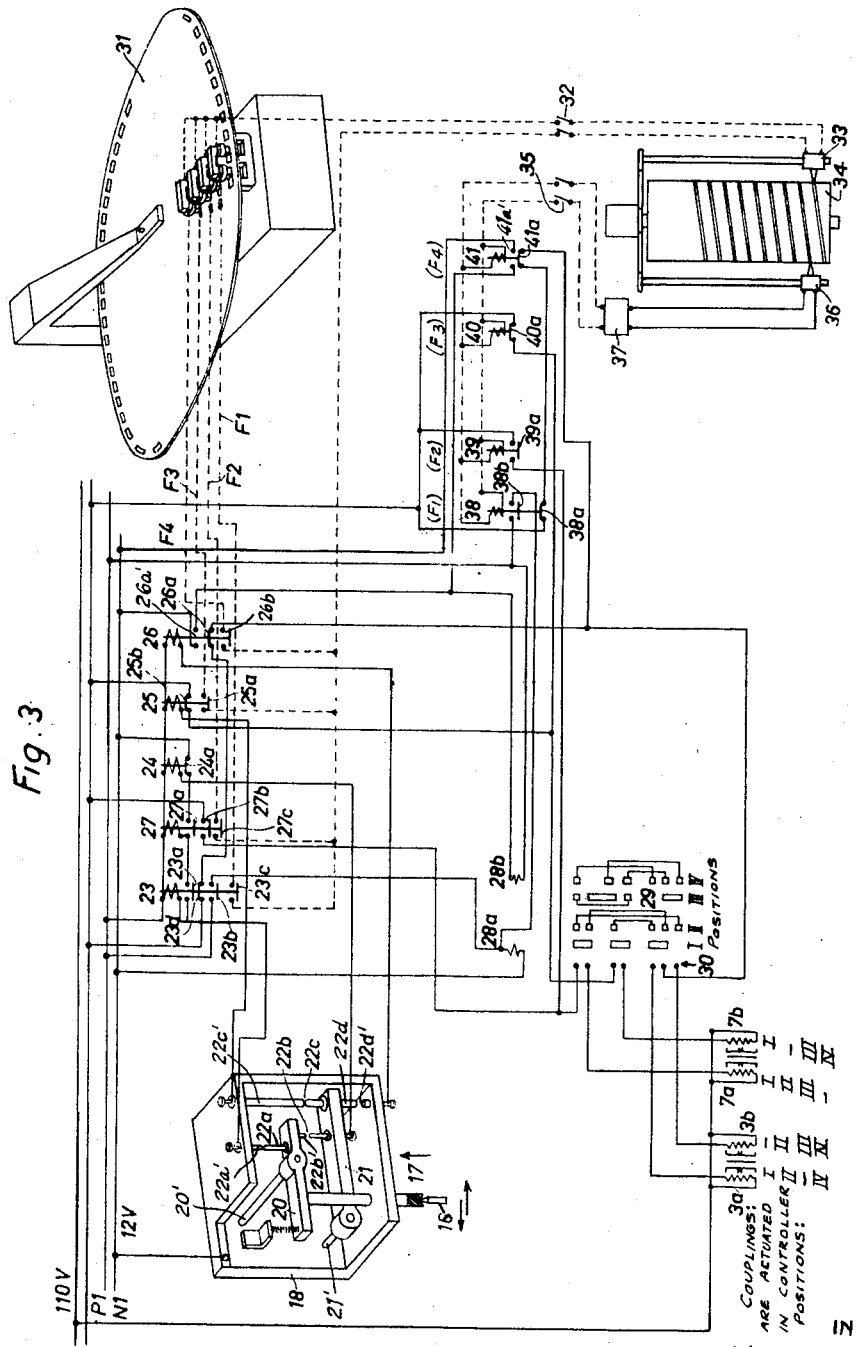

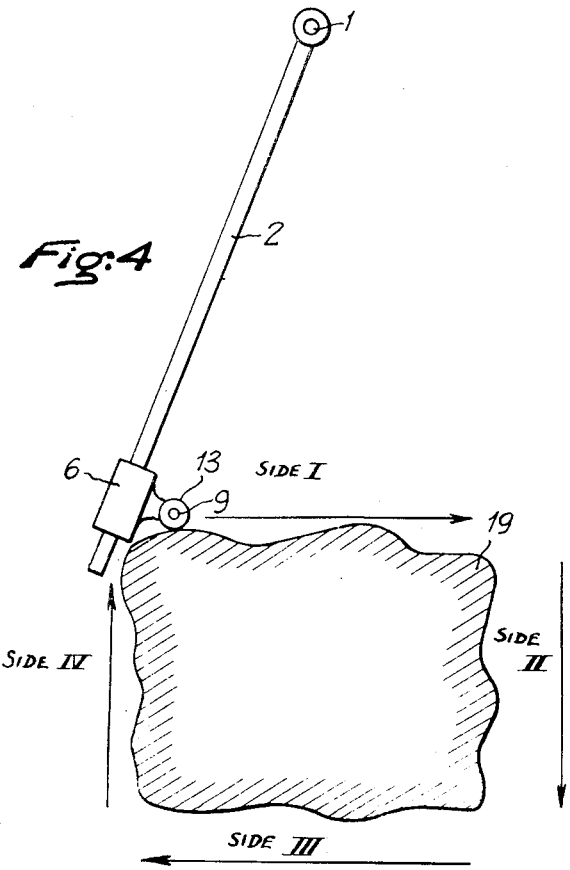
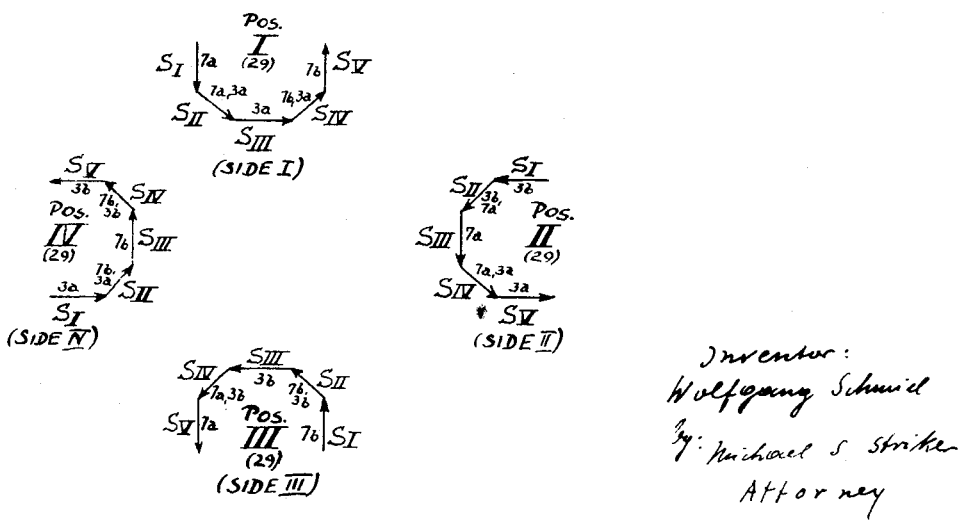

United States Patent Office 2,938,132
Patented May 24, 1960

2,938,132

ELECTRIC CONTROL OF MACHINE TOOLS USING CONTROL IMPULSES OF DIFFERENT FREQUENCIES

Wolfgang Schmid, Gagny, France, assignor to "Automata," Paris, France, a French company Filed Aug. 29, 1952, Ser. No. 306,987

Claims priority, application France Aug. 31, 1951

15 Claims. (Cl. 310—94)

It has already been proposed to provide machine tools with an electric control in which control impulses are used which are characterized by different frequencies respectively corresponding to different operations. The control impulses are received by receiving devices which are sensitive to particular frequencies and are transmitted to corresponding members for actuating the machine. That kind of control results in the possibility of recording or storing the different control impulses and using the different frequencies recorded on the record carrier for repeating automatically the series of different operations of the machine as often as is required.

That kind of control, compared with completely automatic devices for machine tools which are so far known, is distinguished, in particular, by the rapidity of positioning and position changing as well as by the ease and the diversity of the possibilities of adaptation to carrying out series of consecutive working operations. Furthermore, it is no longer necessary to have a stock of diversified tools. The manufacture of the tools is also greatly simplified.

The invention aims at improving the control as well as improving the recording mechanism to attain a considerable economy of time in the work to be performed.

In the control described above at the beginning of this specification, manually operable control members are provided for the manual actuation of the frequency-sensitive members. Therefore, the accuracy of the control depends essentially upon the attention of the operator. The invention, however, provides for actuating the frequency-sensitive members, either instead of manually operable control members or for use in conjunction therewith, an electrical feeler apparatus which explores the contour of a model or of a template corresponding to a part to be made in conformity therewith. It is, of course, possible to retain operation by means of manually operable control members in addition to operation predetermined by the use of a feeler apparatus. The positioning of tools or control elements by means of a feeler has, in comparison with manual positioning, the advantage of greater independence from the attention of an operator and, therefore, the advantages of a greater degree of precision.

However, the decisive advantages of control by means of a feeler arise particularly as a result of recording of the sequence movements. While in the known arrangement first mentioned above, the recording of the frequency band was effected during manufacture of the first sample, and was subjected among other things to frequent interruptions because of the inevitable necessity of checking the machined dimensions the present invention permits to limit oneself to make a recording from a model only which may be formed in any desired manner and of any desired substance and even, in most cases, to use only a template for effecting the recording of the respective frequencies. Consequently, in principle, in such a device, one eliminates interruptions of any kind of the recording. The arrangement according to the invention for the recording of movements of a feeler comprises a system for generating a plurality of frequencies in which each frequency corresponds to the production of an impulse for opening or closing a particular circuit, as well as a frequency recording device connected by a contact arrangement forming part of the feeler apparatus (actuated at each operation) to the multiple frequency system.

A device in accordance with the invention is shown in the attached drawings, in its application to the operation of a milling machine in which, the part to be machined is to be machined over the whole of its periphery.

In these drawings, given by way of non-limiting example:

Figure 3 is a circuit diagram of the recording and reproducing device including a perspective diagrammatic view of the feeler apparatus.

Fig. 4 is a diagram illustrating a portion of the feeler apparatus of Fig. 1 in application to a template; and Fig. 5 is a diagram illustrating the movements of the feeler during exploration of the contour of the template of Fig. 4.

Figure 1:
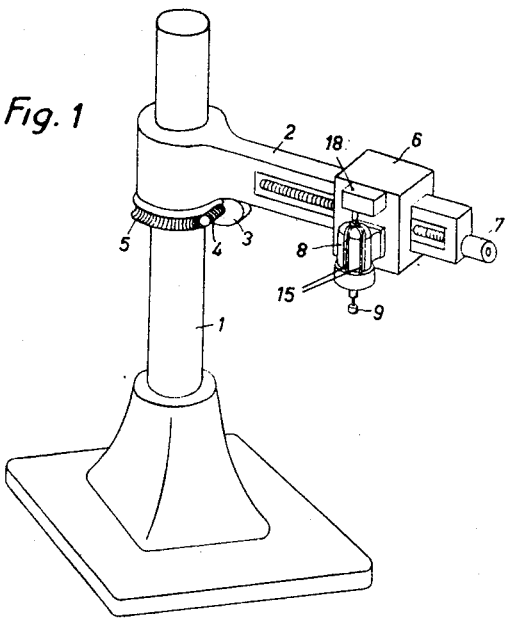
Figure 1 shows a copying milling machine in perspective.
Figure 2:
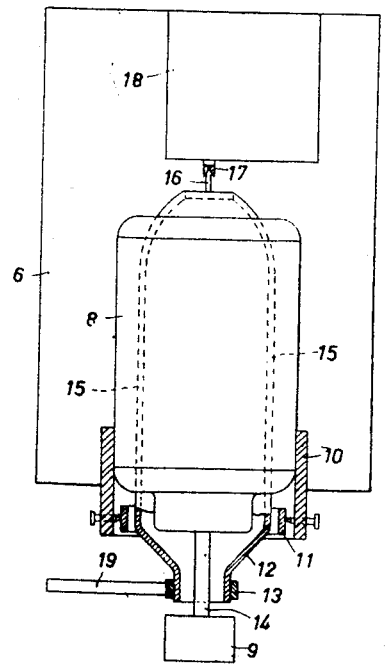
Figure 2 is an elevation to a larger scale with a partial section axial through the tool carrier.

According to Figure 1, the horizontally swingable arm 2 is pivotally mounted on the column 1 of the machine. The rotation in one or the other direction of turn is effected by a motor 3, fixed to the arm 2 and adapted to be coupled by means of an electro-magnetic reversible coupling (not shown) with a worm 4 which meshes with the toothed worm ring 5 fixed to the column 1. Depending upon the position of the coupling, the motor 3 swings the arm 2 clockwise or counterclockwise. The arm 2 carries a support 6, the movement of which along arm 2 is effected by the motor 7 through an electro-magnetic reversible clutch (not shown) which, depending upon its energization by corresponding circuit connections effects the movement of the support away from or towards the column 1 of the machine. On the support 6 is rigidly fixed a motor 8 which during machining operation drives the milling cutter 9. At the lower end or on the lower end plate of the motor 8 is fixed a ring 10 which forms together with an intermediate ring 11 a universal joint support for the bowl 12 which is transversely pivotable in ring 11 and reduced in diameter in its lower part to form a smaller annular portion, as shown. On the smaller annular portion of the bowl is mounted the removable sleeve 13 which serves as a feeler and which surrounds at a certain radial distance the shank 14 of the milling cutter 9. The bowl 12 is connected by means of arms 15 which surround the motor 8 to a rod 16 the tip of which engages the hollow cone end of a push rod 17 and through this rod transmits deflections of the feeler 13 to a system of contacts housed in the casing 18. At the level of the feeler 13 is disposed on the milling machine table, not shown, the template 19 which is made to correspond to the part to be manufactured.

It can be seen that a deflection of the feeler ring 13 by engagement with the contour of the template 19 in any direction causes a rocking movement of the bowl 12 and of the arms 15 carrying the rod 16. The point or tip of rod 16 being conical and engaging the conical recess at the lower end of push rod 17 causes by a sort of cam action the rod 17 to move upwards a distance depending upon the degree of angular displacement of the rod 16 in an extremely sensitive manner.

For duplicating movements which the feeler 13 carries out while exploring the template 19 along the whole of its periphery, control impulses generated in the device 18 are recorded in the form of frequencies (as described below) which may then be transmitted to make the two motors 3 and 7 operative, as will be shown. As the displacements of the feeler 13 occur during the sensing of the peripheral contour of the template 19, the motors 3 and 7 depending upon the reproduction of the recorded control impulses in the form of corresponding frequencies the milling cutter 9 is moved along the work piece in the desired manner conforming to the contour of the template.

The recording and the reproduction of the control impulses or corresponding frequencies will be explained in greater detail with reference to Figure 3 which shows all components in idle position. In the casing 18 are disposed two levers 20 and 21 which are pivotally mounted and capable of being inclined turningly displaced about their respective shafts 20′, 21′ and which in their normal position take up the position shown in the drawings in which the contacts 22a and 22c are closed with respect to stationary contacts 22a′, 22c′, respectively and the contacts 22b and 22d are open with respect to contacts 22b′, 22d′, respectively. The contact 22b is fixed to the lever 21 and insulated from the latter. The casing 18 is connected to the pole $N_1$ of a low tension circuit the pole $P_1$ of which is connected across the windings of the relays 23, 24, 25, 26, respectively, to the contacts 22a′, 22b′, 22c′, 22d′, respectively. When the pressure rod 17 is displaced upwards by a lateral movement of the pressing rod 16 due to its tip engaging the hollow cone end of rod 17, the lever 20 is angularly deflected about shaft 21′ which leads to simultaneous opening of the contacts 22a, 22a′. Upon continuation of the movement of inclination the contacts 22b, 22b′ first of all close, then lever 21 is deflected and the contacts 22c, 22c′ open and finally the contacts 22d, 22d′ close. The above-mentioned sequence of operation of the contacts thus depends upon the degrees of angular displacement of the rod 16 corresponding to the displacements of the feeler 13 during the exploration or sensing of the template.

By first closing the operating circuits for power supply, the windings of the relays 23 and 25 receive current because the contacts 22a, 22a′ and 22c, 22c′ arranged in the circuits of the relays are normally closed. Therefore, the relays 23 and 25 attract their armatures. The working contacts 23a, 23b, 23c and 25a are closed. On the other hand, the normally closed contacts 23d and 25b are open. The working contact 23a closes the circuit of the holding relay 27 so that the working contacts 27a, 27b and 27c are also closed. The working contact 23b closes the circuit of an operating electro-magnet 28a which at each response causes the drum controller 29 (represented diagrammatically by drum contacts in groups I, II, III, IV that may be caused to register with stationary contacts 30 respectively) to turn through one step clockwise. At the first step, the contact segments of the group I are brought into contact with the series of contacts 30 so that the magnetic coupling 7a of the motor 7 (Figure 1) is energized by the closing of contact 27b and the support 6 is moved radially away from the column 1 of the machine. The working contact 23c closes the circuit transmitting the frequency $F_1$ of the multiple frequency generator 31. Similarly, the working contacts 27c and 25a close the circuits of the multiple frequency generator 31 which transmits the frequencies $F_2$ and $F_3$. The circuits which transmit different frequencies are connected by the closed switch 32 in parallel with the impulse recording head 33 of an electro-magnet recording device 34 so that the frequencies $F_1$, $F_2$ and $F_3$ are recorded as long as there is no change in the position of the contacts within the casing 18.

If then, as a result of a first deflection of the rod 16, caused by the feeler 13 abutting in radial direction against the template 19, the contact 22a, 22a′ open, the relay 23 is deprived of current. As the working contact 23c opens the circuit which transmits the frequency $F_1$, the subsequent recording is limited to frequencies $F_2$ and $F_3$. Then, through the rest contact 23d which is now closed and through the rest contact 26a, the electro-magnetic coupling 3a is energized and causes the motor 3 (Figure 1) to rotarily deflect the arm 2 in one direction. Thus, in this state of the connections, the couplings 3a and 7a are engaged, so that a combined rotary and radial displacement (with respect to column 1) of the support 6 which carries the feeler 13 and the tool 9 takes place. This displacement is thus directed at an angle relative to the first described radial movement.

The next change of connections takes place upon closing of the contact 22b (caused by further deflection of rod 16 in case the feeler 13 still meets template 19), the relay 24 then attracts its armature and by opening its rest contact 24a, opens the circuit for the holding relay 27 so that the relay 27 drops and opens the circuit which transmits the frequency $F_2$. At the same time the circuit for the magnetic coupling 7a, that is to say, the coupling 7a itself, is put out of circuit so that only the coupling 3a remains in operation so as to produce only a rotary movement of support 6 about column 1. The recording in this state of the connections is limited to the frequency $F_3$.

If the feeler 13 during the last mentioned rotary movement still meets the template 19, a deflection of still greater amplitude of the rod 16 occurs, the contact 22c opens, the relay 25 is then de-energised and the recording of the frequency $F_3$ ceases. In that state of the connections, the coupling 3a remains engaged; at the same time, the coupling 7b of the motor 7 is engaged by means of the working contact 25b which causes the support 6 to be displaced in the direction toward the column of the machine. As a result of the simultaneous engagement of the couplings 3a and 7b, again a combined rotary and radial displacement of feeler 13 in a different direction relative to column 1 now occurs.

On the next, and greatest, angular deflection, of the rod 16 (if the feeler 13 during the last described movement still meets the template 19), the contact 22d closes so that the relay 26 attracts its armature and closes: on the one hand, at 26a′ the circuit for the electromagnet 28b and on the other hand, the circuit which transmits the frequency $F_4$ of the multiple frequency generator 31. The latter circuit is also, like those for F1, F2, F3, connected by the switch 32 to the impulse recording head 33 of the recording device 34. The relay 26 through its contact 26a opens the circuit of the clutch 3a. Consequently, the only element which remains in circuit is the coupling 7b so as to cause the support 6 to travel along arm 2 in direction toward column 1. The electromagnet 28b actuates a step-by-step switch mechanism one step, in exactly the same manner as the electromagnet 28a so as to change the connections in the drum controller 29, the direction of turn of the drum controller 29, however, being reversed, that is to say, the contact segments of the group I are separated from the series of stationary contacts 30, i.e. the controller 29 is returned to its previous position.

However, as appears clearly from the diagram without further explanation, whenever the rod 16 during the exploration of the template contour returns from a deflected position to the normal vertical position, because feeler 13 is out of contact with template 19, or when maximum deflection has occurred and the feeler 16 has moved away from the template contour with same effect, the starting state of the connections is re-established so that the electro-magnet 28a causes again the controller 29 to be advanced by one step in clockwise direction. During normal operation, such an advancement of the controller 29 by the electro-magnet 28a will occur as a rule when the feeler 13 senses a corner of template 19 because in such a case the last change of connections depending on maximum deflection of rod 16 and energization of electro-magnet 28b do not take place. The contact segments of the groups II, III and IV are arranged and connected to each other in such a manner that the electro-magnetic couplings of the motor 3 and 7 exchange their roles in order that separate or combined displacements of the head 6 effected by the motors 3 and 7, respectively, in the position II of the controller 29 are directed at 90° relatively to those obtained at the position I of the controller. In position III of the controller, the change of displacements are at 180° relatively to those obtained at the position II of the controller and in position IV of the controller the change of direction is 270°; thus, the controller 29 allows the template to be sensed along its whole periphery since, at every "corner" of the pattern 19, energization of 28a moves the controller 29 into its next position adapted to control the sensing along a side of the pattern substantially at 90° with respect to the side sensed previously.

The coupling 3b which can come into action in the positions II, III and IV of the controller 29, corresponds in its function to that of the electro-magnetic coupling 3a but causes opposite direction of rotation of arm 2.

Figs. 4 and 5 illustrate diagrammatically the above described sensing operation. Assuming, for this explanation, the pattern 19 has a peripheral contour composed of four "sides" marked I, II, III, IV, respectively, and extending consecutively at substantially 90° to each other, in the position I of the controller 29 the feeler arrangement is capable of carrying out sensing movements in varying directions SI, SII, SIII, SIV, SV, respectively, as marked in the upper portion of Fig. 5 referring to the position I of the controller and to side I. The sensing movement is a complete U if the feeler 13 meets resistance at the edge of the template continuously so that consecutively through stepwise increasing deflection of the rod 16 finally maximum deflection is reached. Then the U-shaped movement would be repeated, however, the next movement in direction SI would occur at the same location where the last movement SV took place, i.e. slightly offset to the right. Actually the spacing between SI and SV is very small. However, in this manner the feeler is caused to travel along the side I in direction of the arrow shown along side I in Fig. 4.

When through recesses or slopes in the contour along side I the deflection of feeler 13 and rod 16 does not reach maximum, then the feeler will move in one of the other directions along such slope until new resistance is sensed whereafter the cycle repeats.

Consequently, when the feeler reaches the corner where side I blends into side II, no resistance will be met at all so that then the controller switches the sensing system in such a manner that now the U-path of the feeler is turned 90° as shown in the portion of Fig. 5 marked Pos. II and side II.

Now the directions of movements SI–SV are at right angles with respect to their directions during the position I of the controller 29 and the sensing of side I.

The same sequence of movements occurs under similar conditions while the feeler 13 travels from side II to side III and side IV.

The small reference numerals placed alongside the individual direction arrows SI–SV indicate which ones of the electromagnets 3a, 3b, 7a, 7b are respectively energized during the individual movements in the manner explained above.

The diagrams of Figs. 4 and 5 apply analogously to the following description of the reproduction of the recording of the sensing movements i.e. the reproduction of the record for controlling an identical movement of the machine head with the tool 9 along a piece of material for machining its contour to one identical with that of the template 19.

On account of the recording of the frequencies which is effected by means of the devices 33, 34, the actuation of the various couplings 3a, 3b, 7a and 7b as carried out before, as described, can be duplicated. The operation of the device 34, therefore, is changed to reproduction. For the restitution, by opening the switch 32 while, on the other hand, the switch 35 which serves to connect the impulse pick-up head 36 through the amplifier 37 to the relays 38, 39, 40 and 41 is closed. The relays 38–41 are frequency relays. The relay 38 is tuned to the frequency $F_1$, the relay 39 to frequency $F_2$, the relay 40 to frequency $F_3$, and the relay 41 to frequency $F_4$.

During the reproductions of the frequencies in the sequence of their recording, the frequencies $F_1$, $F_2$ and $F_3$ will be reproduced first and provoke responses from the relays 38, 39 and 40.

The relay 38 opens its normally closed contact 38a thus interrupting the circuit for the coupling 3a while its working contact 38b closes the circuit for the operating relay 28a. The group of contacts of the segments I of the controller 29 are thereby brought in contact with the series of stationary contacts 30. The relay 39, through its working contact 39a closes the circuit of the magnetic coupling 7a via the closed contacts of the controller so that the motor 7 moves the support 6 away from the column 1 of the machine. The relay 40 opens its rest contact 40a and, consequently, opens the circuit of the coupling 7b.

The reproduction of the frequencies $F_2$ and $F_3$ then takes place, while reproduction of the frequency $F_1$ is discontinued. In consequence, the relays 39 and 40 remain energized, and the coupling 7a remains in operation. The relay 38, however, is de-energized. The coupling 3a is put into engagement through the normally closed contact 38a. The same displacement scheme is then set up for the tool as was set up during the recording when the contacts 22a, 22a' opened.

The reproduction of the frequency $F_3$ alone then follows, while the frequency $F_2$ disappears and, therefore, the relay 39 drops. Consequently, the coupling 7a disengages. Only the coupling 3a remains in operation. The sequence of movements of the tool thus corresponds to the sequence of movements of the feeler during the recording, when the contacts 22b, 22b' were closed.

The frequency $F_3$ now also disappears from the recording so that the relay 40 drops and, through its normally closed contact 40a causes the coupling 7b to engage. The coupling 3a remains engaged through the normally closed contact 41a of the relay 41 and the normally closed contact 38a of the relay 38.

Finally, the frequency $F_4$ is reproduced so that the relay 41 responds and, by opening its normally closed contact 41a, opens the circuit of the coupling 3a but at the same time closes through contacts 41a' the circuit of the electromagnet 28b. The coupling 7b remains engaged.

Similarly as in the case of the sequence of relay and coupling actions just explained there is also complete accordance thereafter between the sequence of such actions caused by reproducing the recorded frequencies, and the sequence thereof that took place during the recording operation during the phases thereof while the contacts 22c, 22c' were open as well as while the contacts 22d, 22d' were closed.

I claim:

1. An arrangement for exploring the peripheral contour of a template or the like, comprising, in combination, a feeler tiltably mounted for being angularly deflected, upon contact with said contour, from a normal position to various angular degrees in any direction, impulse producing means responsive to the deflections of the feeler for producing a plurality of electrical impulses of different character, each impulse corresponding to a respective deflection of said feeler; moving means for moving said feeler translationally in any one of a plurality of predetermined angularly differing directions in the plane of said contour; control means connected to said impulse producing means and with said moving means for controlling the movement of the feeler relative to said contour, in response to said deflections thereof, in various directions respectively corresponding to the degree of a deflection at a given moment in such a manner that the feeler automatically follows all sides of the contour of the template in succession; and means adapted to simultaneously receive said electrical impulses produced by said impulse producing means for reproduceably recording the impulses produced by said impulse producing means corresponding to the respective deflections of the feeler.

2. An arrangement for exploring the peripheral contour of a template or the like, comprising, in combination, a feeler tiltably mounted for being angularly deflected, upon contact with said contour, from a normal position to various angular degrees in any direction, impulse producing means responsive to the deflections of the feeler for producing a plurality of electrical impulses of different frequencies, each frequency corresponding to a respective deflection of the feeler; moving means for moving said feeler translationally in any one of a plurality of predetermined angularly differing directions in the plane of said contour; control means connected to said impulse producing means and with said moving means for controlling the movements of the feeler relative to said contour, in response to said deflections thereof, in various directions respectively corresponding to the degree of a deflection at a given moment in such a manner that the feeler automatically follows all sides of the contour of the template in succession; and means adapted to simultaneously receive said impulses produced by said impulse producing means for reproduceably recording the different impulses produced by said impulse producing means at their different frequencies corresponding to the respective deflections of the feeler.

3. An arrangement for recording the movements of a contour follower adapted to engage the contour of a template or the like, comprising, in combination, a contour follower movable, upon contact with said contour, to various degrees of displacement from a normal position; means for recording electrical signals; generating means for generating a plurality of electrical signals of discrete frequencies, each of said discrete frequencies corresponding respectively to the respective degrees of displacement of the contour follower; electric circuit means including a circuit interconnecting said recording means and said generating means; relay means forming part of said electric circuit means for selectively transmitting said plurality of electrical signals of discrete frequencies to said means for recording said electrical signals; and switch means forming part of said circuit means and being selectively responsive to the different degrees of displacement of said contour follower, said switch means sequentially actuating said relay means.

4. An arrangement for exploring the peripheral contour of a template or the like, comprising, in combination, a feeler tiltably mounted for being angularly deflected, upon contact with said contour, from a normal position to various angular degrees in any direction, impulse producing means responsive to the deflections of the feeler for producing a plurality of electrical impulses of different character, each impulse corresponding to a respective deflection of the feeler; moving means for moving said feeler translationally in any one of a plurality of predetermined angularly differing directions in the plane of said contour; control means connected to said impulse producing means and with said moving means for controlling the movements of the feeler relative to said contour, in response to said deflections thereof, in various directions respectively corresponding to the degree of deflection at a given moment in such a manner that the feeler automatically follows all sides of the contour of the template in succession; and an electromagnetic recorder adapted to simultaneously receive said impulses produced by said impulse producing means for reproduceably recording the different impulses produced by said impulse producing means corresponding to the deflections of the feeler.

5. An arrangement for recording and reproducing signals corresponding to the movement of a feeler or the like, comprising, in combination, impulse producing means responsive to the movements of the feeler for producing a plurality of impulses of different characters corresponding to the movements of the feeler; control means for controlling the movements of the feeler; means for recording and reproducing the impulses produced by said impulse producing means corresponding to the movements of the feeler; actuating means interconnecting said control means and said reproducing means and being operated by the latter for actuating said control means; and means for connecting and disconnecting, respectively, said impulse producing means and said recording and reproducing means, and for connecting and disconnecting, respectively said actuating and said control means and said recording and reproducing means.

6. An arrangement for recording and reproducing signals corresponding to the movement of a feeler or the like, comprising, in combination, frequency generating means, including means responsive to the movements of the feeler, for generating a plurality of electrical signals of discrete frequencies, each of said frequencies corresponding to a respective position of the feeler; control means for controlling the movements of the feeler; means for recording and reproducing the plurality of electrical signals of discrete frequencies respectively corresponding to the positions of the feeler; actuating means interconnecting said control means and said reproducing means and being operated by the latter for actuating said control means; and means for connecting and disconnecting, respectively, said generating means and said recording and reproducing means, and for connecting and disconnecting, respectively, said actuating and said control means and said recording and said reproducing means.

7. An arrangement for exploring the entire peripheral contour of a template or the like, and for recording the deflections of a feeler while it is exploring the surface contour of the template, comprising, in combination a movable support; a universally tiltable feeler mounted on said support; a plurality of relays having contacts successively controllable by increasing deflections of the feeler; impulse generating means, in circuit with said plurality of relays, respectively, for producing under selective control by said relays a plurality of impulses of different character, each of said plurality of impulses of different character corresponding respectively to the respective deflections of the feeler; control means connected to said impulse producing means for controlling the movements of the movable support in such a manner that said universally mounted feeler on said support automatically follows all sides of the contour of the template; and means adapted to receive the impulses produced by said impulse producing means for recording such impulses respectively corresponding to the deflections of the feeler.

8. An arrangement for exploring the entire peripheral contour of a template or the like, and for recording the movements of a feeler while it is exploring the contour of the template, comprising, in combination, a movable support; a universally tiltable feeler mounted in said support; impulse producing means responsive to the deflections of said feeler for producing a plurality of impulses of different character, each of said impulses of different character respectively corresponding to deflections of the feelers; driving means operatively connected to said movable support for moving the same radially and angularly with respect to a fixed point; movable electromagnetic clutch means electrically connected to said impulse producing means and actuated thereby for controlling the operation of said driving means in such a manner that said support and said universally tiltable feeler mounted on said support automatically follows all sides of the contour of the template; and means adapted to simultaneously receive the impulses produced by said impulse producing means for recording said impulses corresponding to the deflections of said feeler.

9. An arrangement for exploring the entire peripheral contour of a template or the like, and for recording the movements of a feeler while it is exploring the contour of the template, as defined in claim 8, in which control means are connected with said movable clutch means to control the latter selectively so as to move said movable support by said driving means in various directions, respectively.

10. An arrangement for exploring the entire peripheral contour of a template or the like by first control signals corresponding to the different deflections of an automatic tiltable contour follower the movements of which are controlled by said first control signals, and for producing, recording and reproducing corresponding second control signals of a limited number of different characters and which are in turn successively initiated by increasing deflections of the contour follower and are adapted to control the movements of said control follower, comprising, in combination, generating means for generating a plurality of first control signals, and a plurality of corresponding second control signals of relatively different characters, each of said first control signals and of said second control signals of different characters corresponding respectively to a respective deflection of the contour follower; driving means for moving said contour follower in various directions and including actuating means adapted to be made operative by control signals applied to said actuating means and corresponding to respective deflections of the contour follower, said actuating means being connected in circuit with said generating means; a plurality of first relays having relay contacts connected in circuit between said generating means and said actuating means and being responsive to said first control signals corresponding to respective deflections of the contour follower for closing and opening the circuit between said generating means and said actuating means; recording and reproducing means connected in circuit with said generating means for recording and reproducing the recorded second control signals thereof; a plurality of tuned relays connected in circuit between said recording and reproducing means and said actuating means for completing the energization circuit of said actuating means in accordance with any of said second control signals reproduced by said reproducing means; and a commutator connected in circuit between said recording and reproducing means and said first relays, on one hand, and said actuating means, on the other hand, for controlling the selective energization of said actuating means by the respective first control signals or second control signals of different characters alternatively transmitted from said generating means via said first relays, and from said reproducing means via said tuned relays, said commutator being responsive to selected ones of said control signals for respectively changing the selective energization of said actuating means.

11. An arrangement for exploring the entire peripheral contour of a template or the like by first control signals corresponding to the different deflections of an automatic tiltable contour follower the movements of which are controlled by said first control signals, and for producing, recording and reproducing corresponding second control signals of a limited number of different characters and which are in turn successively initiated by increasing deflections of the contour follower and are adapted to control the movement of said contour follower, comprising, in combination, generating means for generating a plurality of first control signals, and a plurality of corresponding second control signals of relatively different frequencies, each of said first control signals and of said second control signals of different frequencies corresponding respectively to a respective deflection of the contour follower; driving means for moving said contour follower in various directions and including actuating means so as to be adapted to be made operative by control signals applied to said actuating means and corresponding to respective deflections of the contour follower, said actuating means being connected in circuit with said generating means; a plurality of first relays having relay contacts connected in circuit between said generating means and said actuating means and being responsive to said first control signals corresponding to respective deflections of the contour follower for closing and opening the circuit between said generating means and said actuating means; recording and reproducing means connected in circuit with said generating means for recording and reproducing the recorded second control signals thereof; a plurality of tuned relays connected in circuit between said recording and reproducing means and said actuating means for completing the energization circuit of said actuating means in accordance with any of said second control signals reproduced by said reproducing means, each of said tuned relays being respectively responsive to said second control signals of a predetermined frequency; and a commutator connected in circuit between said recording and reproducing means and said first relays, on one hand, and said actuating means on the other hand, for controlling the selective energization of said actuating means by respective first control signals or second control signals of different character alternatively transmitted from said generating means via said first relays, and from said reproducing means via said tuned relays, said commutator being responsive to selected ones of said control signals for respectively changing the selective energization of said actuating means.

12. Apparatus as claimed in claim 10, wherein said commutator has a plurality of series of electrical contact members respectively assigned to different positions of the commutator for changing the sequence of transmission of the control signals transmitted to said actuating means; and having means for changing the position of said commutator in such a manner that the contour follower is caused by said control signals to successively follow all sides of the contour of the template.

13. Apparatus as claimed in claim 12, wherein said commutator is rotatably mounted and includes four different contact member combinations, said different combinations corresponding respectively to the exploration of four sides, respectively, adjoining each other substantially at 90°, of the contour of said template.

14. Apparatus as claimed in claim 12, wherein said means for changing the position of said commutator includes a plurality of electromagnetic actuators for said commutator and connected in circuit with said first relays and with said tuned relays so as to be responsive to selected ones of said control signals.

15. Apparatus in accordance with claim 14 wherein said electromagnetic actuators for said commutator are connected in circuit with selected contacts of said first relays and of said tuned relays, other relay contacts of said relays being operatively connected with said actuating means through said commutator contact members in such a manner that the change of position of said commutator is automatically produced by a predetermined deflection of the contour follower and that all sides of the peripheral contour of template are explored successively and automatically.

References Cited in the file of this patent

UNITED STATES PATENTS

| | | |
|---|---|---|
| 2,213,108 | Pollard | Aug. 27, 1940 |
| 2,247,905 | Bryce | July 1, 1941 |
| 2,423,440 | Neergaard | July 8, 1947 |
| 2,438,098 | Tandler | Mar. 16, 1948 |
| 2,475,245 | Leaver et al. | July 5, 1949 |
| 2,484,968 | Sponaugle | Oct. 18, 1949 |
| 2,537,770 | Livingston | Jan. 9, 1951 |
| 2,594,694 | Smith | Apr. 29, 1952 |
| 2,628,539 | Neergaard | Feb. 17, 1953 |
| 2,690,532 | Johnson | Sept. 28, 1954 |
| 2,747,151 | Jaeger | May 22, 1956 |
| 2,777,354 | Stickney | Jan. 15, 1957 |